2,982,726
PREPARATION OF BASIC BARIUM SULFONATES IN A NON-VOLATILE SOLVENT

Paul C. Kemp and Roy C. Sias, Ponca City, Okla., assignors to Continental Oil Company, Ponca City, Okla., a corporation of Delaware No Drawing. Filed Oct. 13, 1958, Ser. No. 766,655

12 Claims. (Cl. 252—18)

The present invention relates to basic barium sulfonates as additives for lubricating oils. More particularly, the present invention relates to an improved process for preparing barium sulfonates of high excess basicity.

The use of barium sulfonates as additive agents in lubricating oils is well known. They function as dispersants for the decomposition products and prevent, or minimize, the deposition of varnish on the piston skirts, upon the rings, and in the ring grooves. The use of basic barium sulfonates is also well known. By basic metal salt is meant one that contains an amount of metal in excess of that theoretically required to replace the acidic hydrogens of the sulfonic acid. The presence of such basicity neutralizes the acidic combustion products, thereby counteracting any potential deleterious effect. The combination of these two functions causes basic barium sulfonates to be very desirable additives for lubricating oils.

The preparation of basic barium sulfonates is also well known. For example, Asseff et al. in U.S. 2,616,924 disclose the preparation of dispersions of barium hydroxide in oil by heating together an oil solution of a barium sulfonate, an aqueous barium oxide slurry, and a phenol and removing the water by heating at 150° C. The phenol in this process functions as a "promoter."

Another process for the preparation of basic barium sulfonates is that disclosed by Mertes in U.S. 2,501,732. In this process a solution or slurry of the desired base is added with stirring to the desired oil-soluble metal sulfonate. The reaction mass is then dehydrated by heating to temperatures of between 150° and 500° F., preferably between 200° and 450° F. If temperatures below 250° F. are used, it may be necessary to use a vacuum in order to effect complete removal of the water. The product is filtered to remove unreacted base or other material which has not been solubilized during the treatment.

In general, one or more of the following difficulties are present in the processes of the prior art:

(1) Low excess basicity,
(2) The formation of a gelatinous, difficultly filterable product,
(3) Low utilization of barium,
(4) Formation of emulsions which are difficult to handle.

The present invention obviates the difficulties encountered in the prior art and provides a convenient and economical process for the preparation of basic barium sulfonates. Further, the present invention provides a process which does not possess gel-forming or filtration difficulties. Still further, the present invention provides a process which has a high utilization of barium.

Broadly stated, the process of the present invention comprises the following:

(a) Forming a solution of oil-soluble sulfonic acid and non-volatile solvent in a volatile aromatic solvent;
(b) Adding a hot aqueous solution of barium hydroxide to the solution of oil-soluble sulfonic acid;
(c) Heating the reaction mixture to reflux temperature to effect complete reaction;
(d) Removing substantially all of the water by means of azeotropic distillation with volatile aromatic solvent;
(e) Removing any residual volatile aromatic solvent by distillation;
(f) Final stripping the product by blowing with a chemically inert gas and then filtering the product.

Any of the sulfonic acids normally used in the manufacture of lubricating oil additives may be used in this process. Examples of these materials would include mahogany sulfonic acid, diwax-benzene sulfonic acid, dinonylnaphthalene sulfonic acid, and postdodecylbenzene sulfonic acid. The preferred material is postdodecylbenzene sulfonic acid. Postdodecylbenzene is a by-product of the manufacture of dodecylbenzene, being the material distilling above dodecylbenzene. Sometimes, in order to improve oil solubility, the lower boiling materials are removed by distillation; and the product is then known as stripped postdodecylbenzene.

Postdodecylbenzene consists of monoalkylbenzenes and dialkylbenzenes in the approximate mole ratio of 2 to 3. Its typical physical properties are as follows:

| | |
|---|---|
| Specific gravity at 38° C. | 0.8649 |
| Average molecular weight | 385 |
| Percent sulfonatable | 88 |

A.S.T.M. D-158, Engler:

| | |
|---|---|
| I.B.P. | ° F__ 647 |
| 5 | ° F__ 682 |
| 50 | ° F__ 715 |
| 90 | ° F__ 760 |
| 95 | ° F__ 775 |
| F.B.P. | ° F__ 779 |
| Refractive index at 23° C. | 1.4900 |

Viscosity at:

| | | |
|---|---|---|
| −10° C. | centipoises__ | 2800 |
| 20° C. | do____ | 280 |
| 40° C. | do____ | 78 |
| 80° C. | do____ | 18 |
| Aniline point | ° C__ | 69 |
| Pour point | ° F__ | −25 |

The purpose of the non-volatile solvent, or, as otherwise known, carrier fluid, is to adjust the concentration of the sulfonate in the final product. The solvent should be relatively high boiling, that is, above 150° C. Because of availability and price, petroleum hydrocarbons of suitable boiling range are preferred. More particularly, the preferred material is a paraffinic lubricating oil having an SSU viscosity at 100° F. of about 100.

The volatile aromatic solvent should, for economic reasons, be one which yields in relatively small proportions an azeotrope with water, and which has a relatively low boiling point. Toluene is the preferred material, although benzene and xylene may be used.

The relative amounts of sulfonic acid, non-volatile solvent, and volatile aromatic solvents to be used are as follows:

| Component | Suitable (Wt. Percent) | Preferred (Wt. Percent) |
|---|---|---|
| Sulfonic acid | 15–35 | 20–28 |
| Non-volatile solvent | 15–35 | 18–23 |
| Volatile aromatic solvent | 30–70 | 50–60 |

The aqueous solution of barium hydroxide to be used is prepared by adding barium oxide, barium hydroxide, and the various hydrates of barium hydroxide to water, or vice versa. A hot (85–100° C.) aqueous solution is employed. The solution should either be gravity settled for several hours or filtered in order to remove insoluble material. Sufficient water should be used to insure complete solubilization of the barium compound. The acceptable amount of water is between 20 and 100 percent (by weight) of the acid mixture, while the preferred amount is between 30 and 50 percent (by weight), including any water of hydration. The amount of barium hydroxide employed is from 1½ to 2½ times that required to react with the sulfonic acid. The utilization of barium by this process is very high, being 90 percent or better.

The neutralization and over-basing reaction are carried out at reflux temperature (about 85° C.). The time required is negligible, being anything from 5 to 60 minutes, with 15 to 30 minutes being preferred. Preferably, sufficient water-soluble barium compound is added at this stage to provide the desired excess basicity. Alternatively, the neutralization and over-basing may be done in two steps, in which case the most of the water present in step one is removed before proceeding to step two.

The use of a volatile aromatic solvent to form an azeotrope with water is a salient feature of this invention. This practice results in essentially eliminating any gelation problem. The amount of solvent used is not critical; however the temperature used is critical. As stated previously, the reaction mass should not be heated above 135° C., preferably not above 115 to 120° C., until water has been completely eliminated. The azeotrope step may be practiced in a variety of ways. For example, one method is to remove all of the water in a one-step operation by adding large amounts of toluene. Alternatively, less toluene may be used if the azeotropic vapor is condensed and the toluene layer continuously recycled to the reaction mass. In such case, the water layer formed on azeotrope condensation is rejected by a conventional trap. A third and convenient laboratory method is to (1) remove considerable water by distilling the product to a maximum pot temperature of 135° C. (preferably 115–120° C.), (2) cool to permit the addition of more volatile aromatic solvent without excessive loss by flashing, and (3) removal of the last traces of water by redistillation.

The product is then stripped by blowing with an inert gas and then filtered through a filter aid, for example, Hyflo. If desired, the product may be stripped by blowing with carbon dioxide, in which case the barium compound is converted to the carbonate, the degree of conversion being dependent on the amount of blowing. These steps are well known in the art.

In order to disclose the nature of the present invention still more clearly, the following illustrative examples will be given. It is to be understood that the invention is not to be limited to the specific conditions or details set forth in these examples except in so far as such limitations are specified in the appended claims.

In these examples the acetic base numbers were determined by the acetic titration method which utilizes glacial acetic acid as the solvent and a solution of perchloric acid in glacial acetic acid as the titrant. The method is especially adapted for determinations of this type, since equilibria are obtained rapidly. The procedure for carrying out acetic acid titrations is generally outlined in Analytical Chemistry, volume 23, No. 2, February 1951, page 337, and volume 24, No. 3, March 1952, page 519.

ASTM base numbers were determined using ASTM procedure D664–54 and by means of a precision automatic titrator.

The expression "PDB" refers to postdodecylbenzene.

EXAMPLE I

The starting material was a crude PDB sulfonic acid which had a total acidity of 2.22 milliequivalents per gram and a sulfonic acidity of 1.19 milliequivalents per gram. Five hundred grams of this crude PDB sulfonic acid was treated with 19 grams of lime, diluted with 680 milliliters of toluene, and then filtered. To the toluene solution of purified sulfonic acid was added 93.5 grams of $Ba(OH)_2 \cdot 8H_2O$ dissolved in 150 milliliters of hot water (90° C.). After complete neutralization, the sulfonate was settled at 50° C. for 48 hours. The aqueous layer was removed by means of a separatory funnel, and 300 grams of the sulfonate (52.8% toluene) was overbased by adding 31 grams of $Ba(OH)_2 \cdot 8H_2O$ dissolved in 60 milliliters of water. The reaction mixture was refluxed (85° C.) for 15 minutes, after which the toluene and most of the water were removed by heating to a pot temperature of 120° C. The reactants were cooled to about 100° C., 150 milliliters of toluene were added, and the remainder of the water removed by azeotropic distillation. The reactants were then blown with nitrogen at 150° C. for 15 minutes, followed by filtration through Hyflo. The product had the following analysis:

Base number (acetic) _____ 67
Base number (ASTM) _____ 61
Percent barium (weight) _____ 13.0
Percent sulfonate (weight) _____ 46.0

EXAMPLE II

A pilot plant batch of basic barium sulfonate was prepared in the following manner:

Equipment: 30-gallon Pfaudler kettle.
Composition of PDB sulfonic acid solution:
    Percent toluene _____ 56.2.
    Percent diluent oil ____ 21.9.
    Percent sulfonic acid __ 21.9.
    Total acidity _____ 0.452 milliequivalent/gram.
    Sulfonic acidity _____ 0.449 milliequivalent/gram.

One hundred thirty pounds of the PDB sulfonic acid was charged to the kettle. To this was added 24.0 pounds of commercial $Ba(OH)_2 \cdot 8H_2O$ dissolved in 36.7 pounds of hot water (90° C.). The $Ba(OH)_2$ solution had been settled overnight at about 90° C. to remove water-insoluble material before charging to the Pfaudler kettle. The reactants were agitated for one hour, while maintaining the temperature at 85° C., then heated to 120° C. to remove organic solvent and water. The reactants were cooled to 100° C., 5 gallons of toluene was added, and the remainder of the water was removed from the reaction mass by azeotropic distillation. The reactants were then blown with nitrogen for two hours at 150° C. Following this, they were slurried with 0.7 pound of Hyflo and then filtered twice through Hyflo. The product had the following analysis:

Base number (acetic) _____ 69
Base number (ASTM) _____ 71
Percent barium (weight) _____ 14.9
Percent sulfur (weight) _____ 2.91
Percent barium sulfonate (weight) _____ 46.3

EXAMPLE III

The PDB sulfonic acid used here was the same as used in Example II. Three hundred grams of this PDB sulfonic acid solution was charged to a reaction flask and heated to 80° C. A solution was prepared containing 53 grams of $Ba(OH)_2 \cdot 8H_2O$ in 100 milliliters of water, heated to 85–90° C., filtered and then added to the sulfonic acid solution. The reaction mixture was heated at reflux temperature for 30 minutes, after which the toluene and most of the water were removed by heating to a pot temperature of 115° C. The reaction mass was cooled to 100° C., 150 milliliters of toluene was added, and the remainder of the water was removed by azeotropic distillation. The reaction mass was blown with nitrogen at 150° C. for one hour. One hundred grams of the reaction mass, thus prepared, was heated to 80° C. and filtered under house vacuum through a heated (Powerstat setting 50 volts) No. 2 Büchner funnel, using 50 milliliters of Hyflo as a precoat. Filtration time was carefully noted. The filtration and other data are shown in the table.

EXAMPLE IV

In this example the process disclosed in U.S. Patent 2,501,731 to Mertes was followed. Specific details of the process were as follows:

One hundred fifty grams of a barium PDB sulfonate (41.0 wt. percent Ba sulfonate) was charged to a one-liter, three-necked flask equipped with a thermometer and heating mantle; and heated to 100° C. An aqueous slurry containing 24 grams of $Ba(OH)_2 \cdot 8H_2O$ in 56 milliliters of water was charged to the reaction flask. The reaction mass was dehydrated by heating to a pot temperature of 200° C., followed by blowing with nitrogen at that temperature for one hour. One hundred grams of the reaction mass was then filtered through a Büchner funnel precoated with Hyflo under exactly the same conditions as Example III. Filtration and other data on this product are shown in the table.

EXAMPLE V

The PDB sulfonic acid used in this preparation had the following analysis:

Percent toluene _____ 51.6.
Percent diluent oil _____ 23.6.
Percent sulfonic acid _____ 24.8.
Total acidity _____ 0.47 milliequivalent/gram.
Sulfonic acidity _____ 0.52 milliequivalent/gram.

Three thousand grams of the PDB sulfonic acid solution was charged to a 12-liter, three-necked reaction flask. An aqueous solution of barium hydroxide was prepared by dissolving 340 grams of commercial barium oxide (analysis—88.5 percent (weight) of BaO) in 1,600 grams of water. The solution was heated to 90° C. and filtered into the reaction flask. The reaction was heated at reflux temperature for 90 minutes, after which the toluene and most of the water were removed by heating to a pot temperature of 125° C. The reaction mass was cooled to about 100° C., whereupon 300 milliliters of toluene was added to the reaction flask. The remainder of the water was removed by azeotropic distillation. The toluene was removed by heating to a pot temperature of 150° C., followed by blowing with nitrogen for one hour at 150° C. The yield of crude reaction product was 1,770 grams. This crude reaction product, which had a slight haze, was slurried with 15.0 grams of Hyflo and filtered through Hyflo. A bright, fluid product resulted which weighed 1,580 grams and had the following analysis:

Base number (acetic) _____ 69
Base number (ASTM) _____ 82
Percent Ba (weight) _____ 14.73

Sufficient barium was charged to theoretically yield a 74 base number product. Based on the 69 acetic base number product, a barium utilization of 93.2 percent was obtained in this preparation.

EXAMPLE VI

The procedure of Example I was followed with the exception that benzene was employed as the solvent instead of toluene. In the overbasing step, the reaction mixture was refluxed at about 70° C., the water and benzene were removed to a pot temperature of 110° C., and the reaction mixture was then cooled to about 85° C. prior to the addition of the benzene. Product analysis was as follows:

Base number (acetic) _____ 69
Base number (ASTM) _____ 62
Percent barium (weight) _____ 13.05
Percent sulfonate (weight) _____ 46.0

EXAMPLE VII

The procedure of Example I was followed with the exception that petroleum xylene, which is a mixture of the three isomers of xylene plus some ethyl benzene, was employed as the solvent instead of toluene. In the overbasing step, the reaction mixture was refluxed at about 90° C. Final solvent stripping was accomplished by the application of house vacuum at 150° C. for about 15 minutes. Product analysis was as follows:

Base number (acetic) _____ 68
Base number (ASTM) _____ 61
Percent barium (weight) _____ 12.95
Percent sulfonate (weight) _____ 46.1

EXAMPLE VIII

To a three-necked, one-liter flask was charged 71.3 grams of a mahogany sulfonic acid (80.0 weight percent active, combining weight 430), 39.1 grams of 100 pale oil having a viscosity of 100 SSU at 100° F., and 150 milliliters of toluene. After mixing, a hot (90° C.) solution of aqueous $Ba(OH)_2$, comprising 46.5 grams of $$Ba(OH)_2 \cdot 8H_2O$$

dissolved in 125 milliliters of water was filtered into the reaction mass. Heat was then applied, and the reaction mass was refluxed (85° C.) for about 15 minutes. Then water and solvent were removed to a pot temperature of 110° C., whereupon 150 milliliters of toluene was charged to the reaction mass, and the residual water was removed by azeotropic distillation. The solvent was then removed from the reaction mass by heating the reaction mass to a pot temperature of 150° C., followed by stripping with gaseous nitrogen for about 15 minutes at that temperature. The reaction mass was then filtered through Hyflo to yield a bright, fluid product which had a base number (acetic) of 64.

The examples have shown a convenient and economical process for the preparation of barium sulfonates of high excess basicity. The data presented in Example V indicate that the process of this invention provides a high utilization of barium. In addition, the formation of difficultly filterable gels is quite negligible in the process of the present invention. The process used in Example IV is representative of the prior art. The data presented in the table clearly indicate the superiority of the present process.

Table
PRODUCT COMPARISON—EXAMPLES III AND IV

| Product Data | Example III | Example IV |
|---|---|---|
| Base number (acetic) | 81 | >27 |
| Filtration time (minutes) | 44 | >240 |
| Filtration rate (gram/minute) | 2.27 | <0.416 |
| Appearance | Bright | Hazy |

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A process for preparing a dispersion of a barium hydroxide in a barium salt of an oil-soluble sulfonic acid, said process comprising the following steps:

(a) dissolving a mixture of 15 to 35 parts of oil-soluble sulfonic acid and 15 to 35 parts of non-volatile solvent in 30 to 70 parts of a volatile aromatic hydrocarbon solvent selected from the group consisting of toluene, benzene, and xylene, (b) adding a hot aqueous solution of barium hydroxide to the solution of oil-soluble sulfonic acid, said solution of barium hydroxide containing from about 1½ to about 2½ times the amount of barium hydroxide required to react with the sulfonic acid, (c) heating the reaction mixture at reflux temperatures, (d) removing substantially all of the water by azeotropic distillation with the volatile aromatic hydrocarbon solvent, (e) removing any residual volatile aromatic solvent by distillation, (f) stripping and filtering the product.

2. The process of claim 1, wherein the oil-soluble sulfonic acid is postdodecylbenzene sulfonic acid.

3. The process of claim 1, wherein the oil-soluble sulfonic acid is a mahogany sulfonic acid.

4. The process of claim 1, wherein the volatile aromatic solvent is toluene.

5. The process of claim 1, wherein the volatile aromatic solvent is benzene.

6. The process of claim 1, wherein the volatile aromatic solvent is xylene.

7. The process of claim 1, wherein the non-volatile solvent is a paraffinic lubricating oil having an SSU viscosity at 100° F. of about 100.

8. The process of claim 1, wherein the addition of barium hydroxide in step (b) is conducted as a two-step operation, the first being a neutralization step and the second being an overbasing step, wherein the total amount of barium hydroxide used is from 1½ to 2½ times that required to react with the sulfonic acid.

9. The process of claim 2, wherein the non-volatile solvent is a paraffinic lubricating oil having an SSU viscosity at 100° F. of about 100.

10. The process of claim 3, wherein the non-volatile solvent is a paraffinic lubricating oil having an SSU viscosity at 100° F. of about 100.

11. The process of claim 9, wherein the volatile aromatic solvent is toluene.

12. The process of claim 11, wherein the volatile aromatic solvent is toluene.

References Cited in the file of this patent
UNITED STATES PATENTS

| | | |
|---|---|---|
| 2,739,125 | Myers et al. | Mar. 20, 1956 |
| 2,779,784 | Sharrah | Jan. 29, 1957 |